United States Patent
Liu et al.

(10) Patent No.: US 11,860,574 B2
(45) Date of Patent: Jan. 2, 2024

(54) HOLOGRAPHIC OPTICAL APPARATUS, HOLOGRAPHIC OPTICAL SYSTEM, AND HOLOGRAPHIC DISPLAY SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaoru Liu, Beijing (CN); Hongshu Zhang, Beijing (CN); Jun Wu, Beijing (CN); Xiaoling Xu, Beijing (CN); Hebin Zhao, Beijing (CN)

(73) Assignees: BEIJING BOE DISPLAY TECHNOLOGY CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 447 days.

(21) Appl. No.: 17/262,959

(22) PCT Filed: May 25, 2020

(86) PCT No.: PCT/CN2020/092024
§ 371 (c)(1),
(2) Date: Jan. 25, 2021

(87) PCT Pub. No.: WO2020/238834
PCT Pub. Date: Dec. 3, 2020

(65) Prior Publication Data
US 2021/0240133 A1 Aug. 5, 2021

(30) Foreign Application Priority Data
May 28, 2019 (CN) .......................... 201910453827.0

(51) Int. Cl.
*G03H 1/04* (2006.01)
*G03H 1/02* (2006.01)

(52) U.S. Cl.
CPC ............. *G03H 1/0402* (2013.01); *G03H 1/02* (2013.01); *G03H 2001/0216* (2013.01);
(Continued)

(58) Field of Classification Search
None
See application file for complete search history.

(56) References Cited

U.S. PATENT DOCUMENTS

2012/0008482 A1* 1/2012 Bablumyan .......... G03H 1/0011
2013/0128255 A1 5/2013 Liu
(Continued)

FOREIGN PATENT DOCUMENTS

| CN | 1702487 | 11/2005 |
|---|---|---|
| CN | 103197429 | 7/2013 |

(Continued)

OTHER PUBLICATIONS

Notification to Grant Patent Right for Invention from Chinese Patent Office (w/ English Translation) for corresponding Chinese Application 201910453827.0, dated Feb. 23, 2021, 9 pages.
(Continued)

*Primary Examiner* — Jennifer D. Carruth
(74) *Attorney, Agent, or Firm* — Dority & Manning, P.A.

(57) ABSTRACT

A holographic optical apparatus includes a beam splitting component, a transmission assembly, a focal length modulation component and an optical element. The beam splitting component splits received light into reference light and signal light that are coherent light, and outputs the reference light and the signal light. The focal length modulation component includes a plurality of local length modulation regions with different focal lengths. The optical element includes a recording medium layer with a plurality of recording regions, and each recording region is located in a light-exit path of a focal length modulation region. The
(Continued)

transmission assembly is disposed in a light-exit path of the beam splitting component, transmit the reference light to the plurality of recording regions and transmit the signal light to the plurality of focal length modulation regions.

14 Claims, 7 Drawing Sheets

(52) U.S. Cl.
CPC ............. G03H 2001/0224 (2013.01); G03H 2001/0264 (2013.01); G03H 2222/45 (2013.01); G03H 2223/24 (2013.01); G03H 2225/22 (2013.01); G03H 2260/12 (2013.01)

(56) References Cited

U.S. PATENT DOCUMENTS

| | | | |
|---|---|---|---|
| 2017/0075303 A1 | 3/2017 | Meng | |
| 2017/0090421 A1 | 3/2017 | Minabe et al. | |
| 2017/0199496 A1* | 7/2017 | Grata | H04N 13/395 |
| 2019/0155218 A1 | 5/2019 | Boureau et al. | |

FOREIGN PATENT DOCUMENTS

| | | |
|---|---|---|
| CN | 106125318 | 11/2016 |
| CN | 106292238 | 1/2017 |
| CN | 106773585 | 5/2017 |
| CN | 206421129 | 8/2017 |
| CN | 107367845 | 11/2017 |
| CN | 207676126 | 7/2018 |
| CN | 108501363 | 9/2018 |
| CN | 109799688 | 5/2019 |
| CN | 110187626 | 8/2019 |
| WO | WO2008032939 | 3/2008 |

OTHER PUBLICATIONS

First Chinese Office Action from Chinese Patent Office (w/ English Translation) for corresponding Chinese Application No. 201910453827.0, dated Oct. 23, 2020, 15 pages.

International Search Report (w/ English Translation) for corresponding PCT Application No. PCT/CN2020/092024, dated Aug. 24, 2020, 6 pages.

* cited by examiner

HOLOGRAPHIC OPTICAL APPARATUS, HOLOGRAPHIC OPTICAL SYSTEM, AND HOLOGRAPHIC DISPLAY SYSTEM

CROSS-REFERENCE TO RELATED APPLICATIONS

This application is a national phase entry under 35 USC 371 of International Patent Application No. PCT/CN2020/092024 filed on May 25, 2020, which claims priority to Chinese Patent Application No. 201910453827.0, filed on May 28, 2019, which are incorporated herein by reference in their entirety.

TECHNICAL FIELD

Embodiments of the present disclosure relate to a holographic optical apparatus, a holographic optical system, and a holographic display system.

BACKGROUND

With continuous development of display technologies, three-dimensional (3D) display technology has become increasingly popular and practical. In a process of achieving 3D display, a left eye and a right eye of a user may receive different images. The above two images may form a stereoscopic image pair with horizontal parallax, and eventually form a stereoscopic image with a sense of depth through fusion of a brain. However, since the images received by the left eye and the right eye of the user are different, a problem of vergence-accommodation conflict may be easy to occur. The vergence-accommodation conflict may cause problems such as blurring and dizziness when the user watches a 3D display image.

SUMMARY

In an aspect, a holographic optical apparatus is provided. The holographic optical apparatus includes a beam splitting component, a transmission assembly, a focal length modulation component and an optical element. The beam splitting component is configured to split received light into reference light and signal light, and output the reference light and the signal light. The reference light and the signal light are coherent light. The focal length modulation component includes a plurality of focal length modulation regions, and focal lengths of the plurality of focal length modulation regions are different from each other. The optical element includes a recording medium layer. The recording medium layer includes a plurality of recording regions, and each recording region is located in a light-exit path of a focal length modulation region. The transmission assembly is disposed in a light-exit path of the beam splitting component. The transmission assembly is configured to transmit the reference light to the plurality of recording regions, and transmit the signal light to the plurality of focal length modulation regions. The recording medium layer is configured to receive the signal light after being modulated by the focal length modulation region, and record interference fringes generated by interference between the signal light and the reference light in the recording region.

In some embodiments, the transmission assembly includes: a first transmission portion configured to transmit the reference light to the plurality of recording regions; a second transmission portion configured to transmit the signal light to part of the plurality of focal length modulation regions; and a third transmission portion configured to transmit the signal light to a remaining part of the plurality of focal length modulation regions.

In some embodiments, at least one of the second transmission portion and the third transmission portion includes a first reflecting component and a second reflecting component. The first reflecting component is configured to receive the signal light exiting from the beam splitting component, and transmit the signal light to the second reflecting component. The second reflecting component is a rotatable reflecting component, and the second reflecting component is configured to transmit the received signal light to different focal length modulation regions at different rotation angles.

In some embodiments, a number of the focal length modulation regions is four. The second transmission portion and the third transmission portion each include the first reflecting component and the second reflecting component. The second reflecting component in the second transmission portion is configured to transmit the received signal light to a first focal length modulation region at a third rotation angle, and transmit the received signal light to a second focal length modulation region at a fourth rotation angle. The second reflecting component in the third transmission portion is configured to transmit the received signal light to a third focal length modulation region at a fifth rotation angle, and transmit the received signal light to a fourth focal length modulation region at a sixth rotation angle.

In some embodiments, the second transmission portion and the third transmission portion include a same first reflecting component, and the first reflecting component is a rotatable reflecting component. The second transmission portion and the third transmission portion each include a second reflecting component. The first reflecting component is a rotatable reflecting component. The first reflecting component is configured to receive the signal light exiting from the beam splitting component, transmit the signal light to a second reflecting component in the second transmission portion at a first rotation angle, and transmit the signal light to a second reflecting component in the third transmission portion at a second rotation angle.

In some embodiments, a number of the focal length modulation regions is four. The second reflecting component in the second transmission portion is configured to transmit the received signal light to a first focal length modulation region at a third rotation angle, and transmit the received signal light to a second focal length modulation region at a fourth rotation angle. The second reflecting component in the third transmission portion is configured to transmit the received signal light to a third focal length modulation region at a fifth rotation angle, and transmit the received signal light to a fourth focal length modulation region at a sixth rotation angle.

In some embodiments, at least one of the first reflecting component and the second reflecting component is a micro electro-mechanical system micro-mirror.

In some embodiments, the first transmission portion is a micro electro-mechanical system micro-mirror.

In some embodiments, the focal length modulation component includes a spatial light modulator. The spatial light modulator includes an upper substrate, a lower substrate, a liquid crystal layer located between the upper substrate and the lower substrate, a lower polarizer located on a side of the lower substrate away from the upper substrate, and an upper polarizer located on a side of the upper substrate away from the lower substrate. The spatial light modulator has a plurality of sub-units, each sub-unit is provided with a first electrode and a second electrode therein, the first electrode is disposed on the lower substrate, and the second electrode is disposed on the lower substrate or the upper substrate.

In some embodiments, the focal length modulation component includes a lens group. The lens group includes a plurality of lenses with different focal lengths, and a region where each lens is located is a focal length modulation region.

In some embodiments, the holographic optical apparatus further includes a collimating beam expander. The collimating beam expander is disposed at a light incident side of the beam splitting component, and the collimating beam expander is configured to collimate and expand light directed to the beam splitting component.

In some embodiments, the recording medium layer is a photosensitive polymer layer.

In another aspect, a holographic optical system is provided. The holographic optical system includes a light source and the holographic optical apparatus according to any one of the above embodiments.

In some embodiments, the light source is a display device or a projection device.

In yet another aspect, a holographic display system is provided. The holographic optical system includes a light source, a beam splitting component, a first transmission portion and an optical element. The beam splitting component is configured to receive light emitted by the light source and output reference light. The first transmission portion is disposed in a light-exit path of the beam splitting component, and the first transmission portion is configured to transmit the reference light to the optical element. The optical element includes a recording medium layer. The recording medium layer includes a plurality of recording regions, and the recording medium layer is configured to record interference fringes in recording regions.

BRIEF DESCRIPTION OF THE DRAWINGS

In order to describe technical solutions in the present disclosure more clearly, accompanying drawings to be used in some embodiments of the present disclosure will be introduced below briefly. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Figure 1:
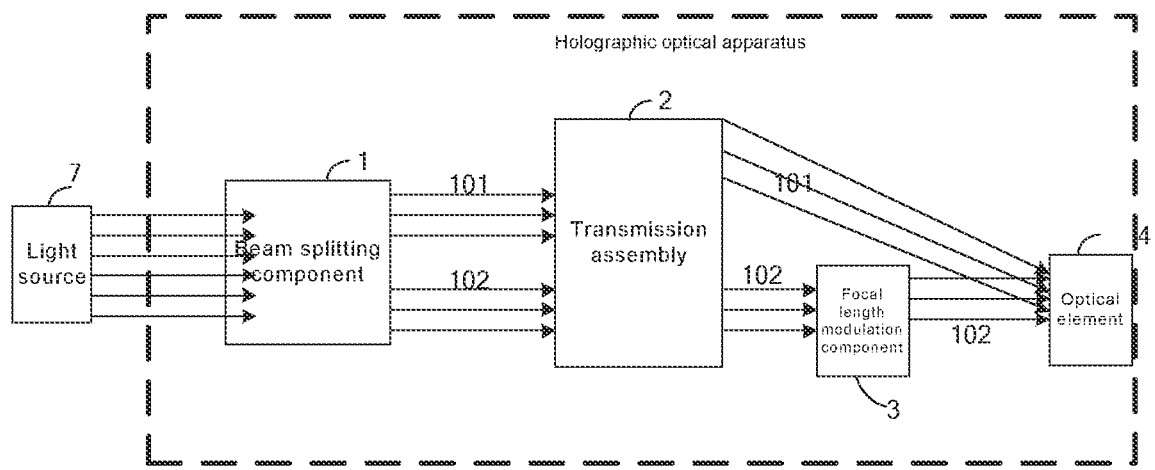
FIG. 1 is a diagram illustrating a structure of a holographic optical apparatus, in accordance with some embodiments of the present disclosure.
Figure 2A:
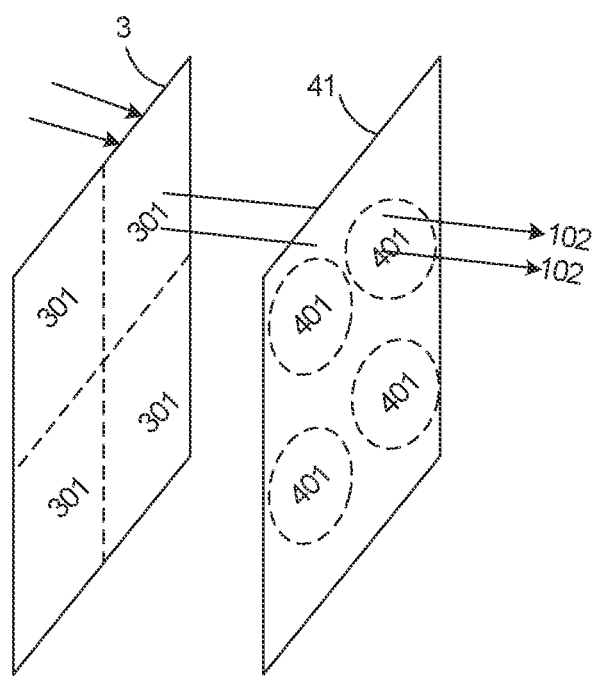
FIG. 2A is a diagram illustrating an optical path of signal light travelling from a first focal length modulation region to a first recording region, in accordance with some embodiments of the present disclosure.
Figure 2B:
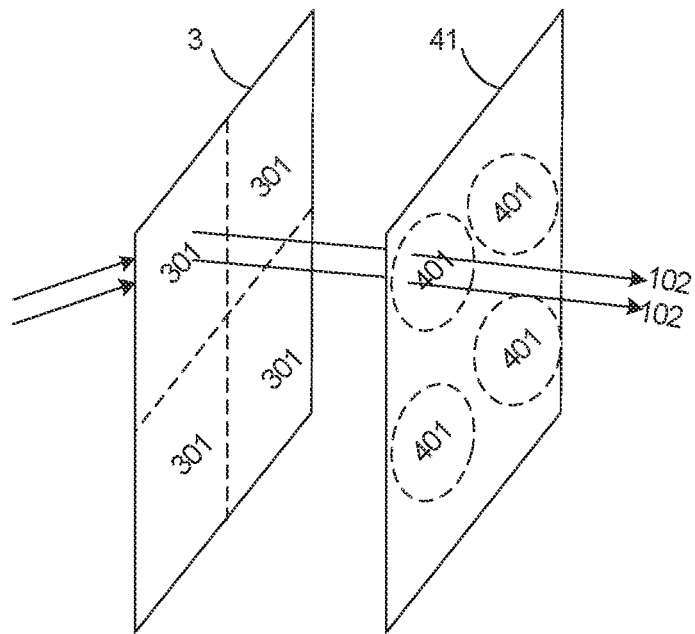
FIG. 2B is a diagram illustrating an optical path of signal light travelling from a second focal length modulation region to a second recording region, in accordance with some embodiments of the present disclosure.
Figure 2C:
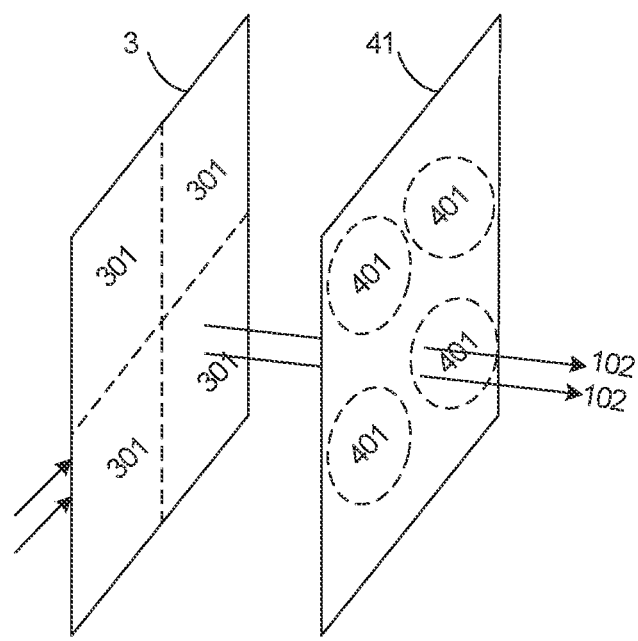
FIG. 2C is a diagram illustrating an optical path of signal light travelling from a third focal length modulation region to a third recording region, in accordance with some embodiments of the present disclosure.
Figure 2D:
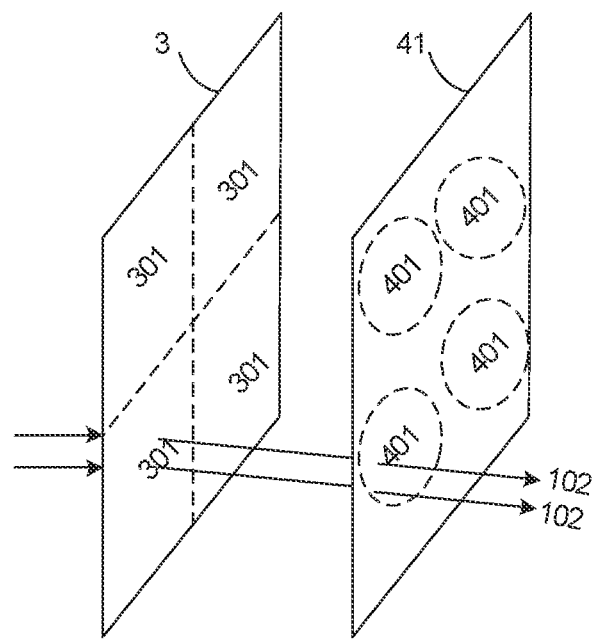
FIG. 2D is a diagram illustrating an optical path of signal light travelling from a fourth focal length modulation region to a fourth recording region, in accordance with some embodiments of the present disclosure.

Technical solutions in some embodiments of the present disclosure will be described below clearly and completely in combination with the accompanying drawings. Obviously, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "including, but not limited to". In the description of the specification, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" and "the plurality of" each means two or more unless otherwise specified.

In the description of some embodiments, the terms such as "coupled" and "connected" and their derivatives may be used. For example, the term "connected" may be used in the description of some embodiments to indicate that two or more components are in direct physical or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B, and C" has a same meaning as the phrase "at least one of A, B, or C", and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phrase "applicable to" or "configured to" herein is meant as an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Holographic technology is a technology for recording and reproducing a real three-dimensional image of an object by using interference and diffraction principles. The three-dimensional image reproduced by using the holographic technology has a strong stereoscopic effect and a real visual effect.

Based on this, some embodiments of the present disclosure provide a holographic optical apparatus. As shown in FIG. 1, the holographic optical apparatus includes a beam splitting component 1, a transmission assembly 2, a focal length modulation component 3, and an optical element 4.

The beam splitting component 1 may receive light emitted by a light source 7, split the received light into reference light 101 and signal light 102, and output the reference light 101 and the signal light 102. The reference light 101 and the signal light 102 are coherent light.

That is, after entering the beam splitting component 1, the light emitted by the light source 7 (e.g., a display device or a projection device) may be split into the reference light 101 and the signal light 102. The reference light 101 and the signal light 102 are the coherent light. The reference light 101 and the signal light 102 will interfere with each other when meeting, and generate interference fringes. Optionally, the beam splitting component 1 may be a beam splitter.

The transmission assembly 2 is disposed in a light-exit path of the beam splitting component 1. For example, the transmission assembly 2 may be directly disposed at a light-exit side of the beam splitting component 1. The transmission assembly 2 is used to transmit the reference light 101 to the optical element 4, and transmit the signal light 102 to each focal length modulation region of the focal length modulation component 3.

Herein, the transmission assembly 2 transmits the signal light 102 to each focal length modulation region of the focal length modulation component 3. That is, through the transmission of the transmission assembly 2, signal light 102 exiting from the beam splitting component 1 each time may be directly transmitted to a focal length modulation region of a plurality of focal length modulation regions. Therefore, times for respective focal length modulation regions receiving the signal light 102 may be different. For example, through the transmission of the transmission assembly 2, signal light 102 exiting from the beam splitting component 1 for a first time is transmitted to one of the focal length modulation regions of the focus length modulation component 3, and then signal light 102 exiting from the beam splitting component 1 for a second time is transmitted to another of the focal length modulation regions of the focal length modulation component 3, and so on.

As shown in FIGS. 2A to 2D, the focal length modulation component 3 includes a plurality of focal length modulation regions 301, and focal lengths of the plurality of focal length modulation regions 301 are different from each other. That is, the focal length modulation regions 301 have different capabilities of modulating the signal light 102. For example, the focal length modulation regions 301 have different capabilities of modulating phases of the signal light 102.

For example, the signal light 102 from the beam splitting component 1 is a plane wave, and thus the signal light 102 is parallel light before being modulated by the focal length modulation component 3. After the signal light 102 passes through the focal length modulation regions 301 of the focal length modulation component 3, the signal light 102 becomes spherical waves. In this case, images formed by the signal light 102 are located in focal planes of the focal length modulation regions 301 that the signal light 102 passes through, respectively. It will be seen therefrom that, in a case where the focal lengths of the plurality of focal length modulation regions 301 are different from each other, after the signal light 102 from the transmission assembly 2 passes through the focal length modulation regions 301 of the focal length modulation component 3, image distances of the images formed by the signal light 102 modulated by the focal length modulation regions 301 are different from each other.

For example, the focal length modulation regions 301 with different focal lengths may change the phases of the signal light to varying degrees, so that the image distances of the images formed by the signal light 102 modulated by the focal length modulation regions 301 may be changed.

The optical element 4 may be disposed at a light-exit side of the focal length modulation component 3, and the optical element 4 includes a recording medium layer. As shown in FIGS. 2A to 2D, the recording medium layer 41 includes a plurality of recording regions 401, and the plurality of recording regions 401 are in one-to-one correspondence with the plurality of focal length modulation regions 301, that is, each recording region 401 is located in a light-exit path of a focal length modulation region 301. The recording medium layer 41 is used to record, in each recording region 401, interference fringes generated by signal light 102 reaching the recording region 401 through a focal length modulation region 301 corresponding to the recording region 401 and the reference light 101.

It will be understood that, similar to a manner in which the signal light 102 is sequentially transmitted to focal length modulation regions 301 of the focal length modulation component 3, the reference light 101 exiting from the beam splitting component 1, after being transmitted by the transmission assembly 2, may also separately reach recording regions 401 in the recording medium layer 41 of the optical element 4. That is, through the transmission of the transmission assembly 2, reference light 101 exiting from the beam splitting component 1 each time may be directly transmitted to a recording region 401 of the plurality of recording regions 401. Therefore, times for recording regions 401 receiving the reference light 101 may be different. In this case, the reference light 101 transmitted to each recording region 401 and the signal light 102 modulated by the focal length modulation region 301 corresponding to the recording region 401 in the focal length modulation component 3 may synchronously reach the recording region 401. In addition, it is also possible that reference light 101 exiting from the beam splitting component 1 may simultaneously reach each recording region 401.

Herein, the optical element 4 may only include the recording medium layer 41, and in this case, the recording medium layer 41 is the optical element 4. Of course, in addition to the recording medium layer 41, the optical element 4 may further include a transparent carrier substrate, such as a glass substrate, and the recording medium layer 41 may be fixedly disposed on the transparent carrier substrate.

It will be noted that, the plurality of recording regions 401 may be in one-to-one correspondence with the plurality of focal length modulation regions 301. That is, the signal light 102, after exiting from any focal length modulation region 301 of the focal length modulation component 3, travels to a recording region 401 corresponding to the focal length modulation region 301.

It will be seen from the above description that, the signal light 102 separately travels to each focal length modulation region 301 of the focal length modulation component 3. Accordingly, as shown in FIGS. 2A to 2D, the signal light 102 may separately travel to the recording regions 401 corresponding to the focal length modulation regions 301. That is to say, the signal light 102, after being transmitted to any focal length modulation region 301, immediately travels to the recording region 401 corresponding to the focal length modulation region 301. The signal light is substantially synchronized to be transmitted to any focal length modulation region 301 and the recording region 401 corresponding to the focal length modulation region 301.

In each recording region 401 of the optical element 4, the signal light 102 and the reference light 101 generate interference fringes. In different recording regions 401, since the image distances of the images formed after the signal light 102 passes through the focal length modulation regions 301 with different focal lengths are different, phases of the generated interference fringes are different. The interference fringes include phase information and amplitude information of the signal light 102. For example, in a case where the light source 7 is a display device or a projection device, the interference fringes include phase information and amplitude information of an image.

A person skilled in the art will understand that, an implementation of the holographic technology is divided into two steps, i.e., "interference recording" and "diffraction reproduction". A recording process of the interference fringes is the "interference recording".

For the "diffraction reproduction", the optical element 4 in which the interference fringes have been recorded needs to be irradiated with the reference light 101. The interference fringes generate a restored image under the irradiation of the reference light 101. Similar to a manner in which the reference light 101 enters the recording regions 401 in the recording medium layer 41 of the optical element 4 in the above "interference recording" process, in a "diffraction reproduction" process, the reference light 101 may separately enter recording regions 401 in the recording medium layer 41 of the optical element 4, or may simultaneously enter the recording regions 401 in the recording medium layer 41 of the optical element 4. In each recording region 401, the interference fringes may generate a complete restored image under the irradiation of the reference light 101, the restored image in each recording region 401 has an image distance, and image distances of restored images in the plurality of recording regions 401 are different from each other.

Figure 3:
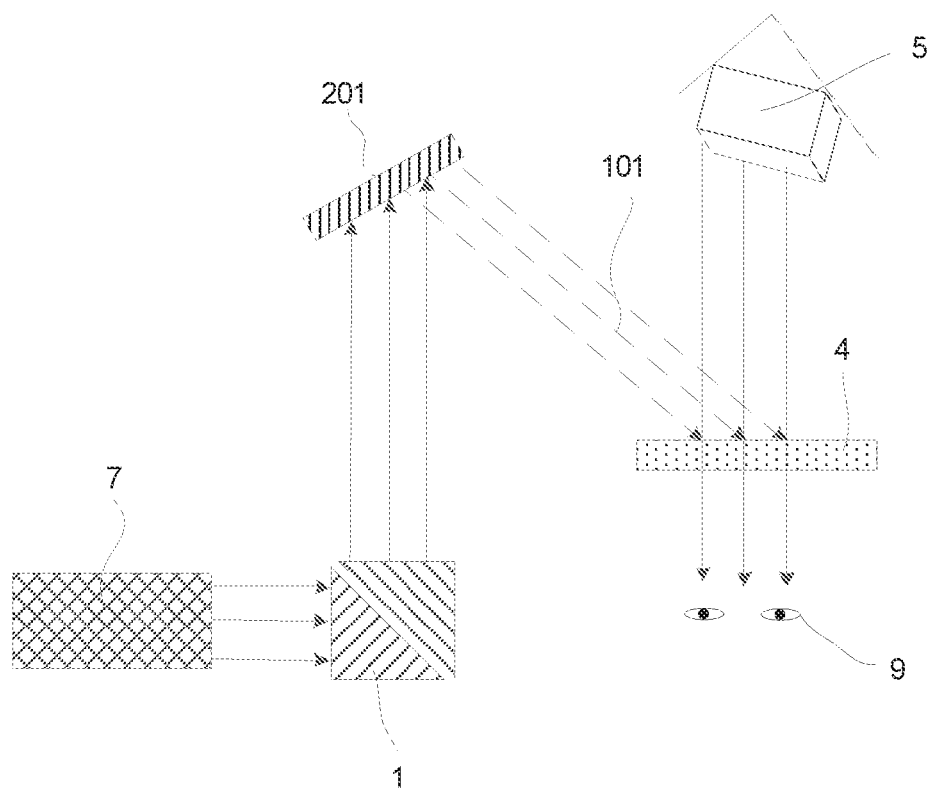
FIG. 3 is a diagram illustrating a principle of diffraction reconstruction displayed by using a holographic display system, in accordance with some embodiments of the present disclosure.

As shown in FIG. 3, the diffraction reproduction process may be as follows: for example, when interference fringes in a recording region 401 are restored, light exiting from the light source 7, after being split by the beam splitting component 1, may generate same reference light 101 as reference light 101 when the interference fringes are formed. After the reference light 101 is irradiated on the interference fringes, the signal light 102 may be restored. After the interference fringes in the plurality of recording regions 401 are separately restored, a plurality of restored images with different depths of field may be obtained, and a reconstructed image 5 with a three-dimensional effect may be constructed after the plurality of restored images are combined. The reconstructed image 5 not only has a strong stereoscopic effect when viewed by human eyes 9, but also does not cause a problem of vergence-accommodation conflict.

In the holographic optical apparatus provided by the present embodiment, the focal length modulation component 3 is provided to include a plurality of focal length modulation regions 301, and the focal lengths of the plurality of focal length modulation regions 301 are different from each other; and the recording medium layer 41 is provided to include a plurality of recording regions 401 in one-to-one correspondence with the focal length modulation regions 301, and the interference fringes with different phases may be separately recorded in the plurality of recording regions 401. Based on this, the restored images presented after the interference fringes in respective recording regions 401 are restored by the reference light 101 have different image distances. Based on this, since the image distances of the restored images restored in the plurality of recording regions 401 are different, and the depths of field of the restored images with different image distances are different, when the human eyes 9 are viewing the reconstructed image 5 constructed by the plurality of restored images with different depths of field, the problem of vergence-accommodation conflict may be avoided, discomfort phenomena such as dizziness, diplopia and blurring may not occur, and the reconstructed image 5 viewed by the human eyes 9 has a strong stereoscopic effect and an optimal contrast.

Figure 4:
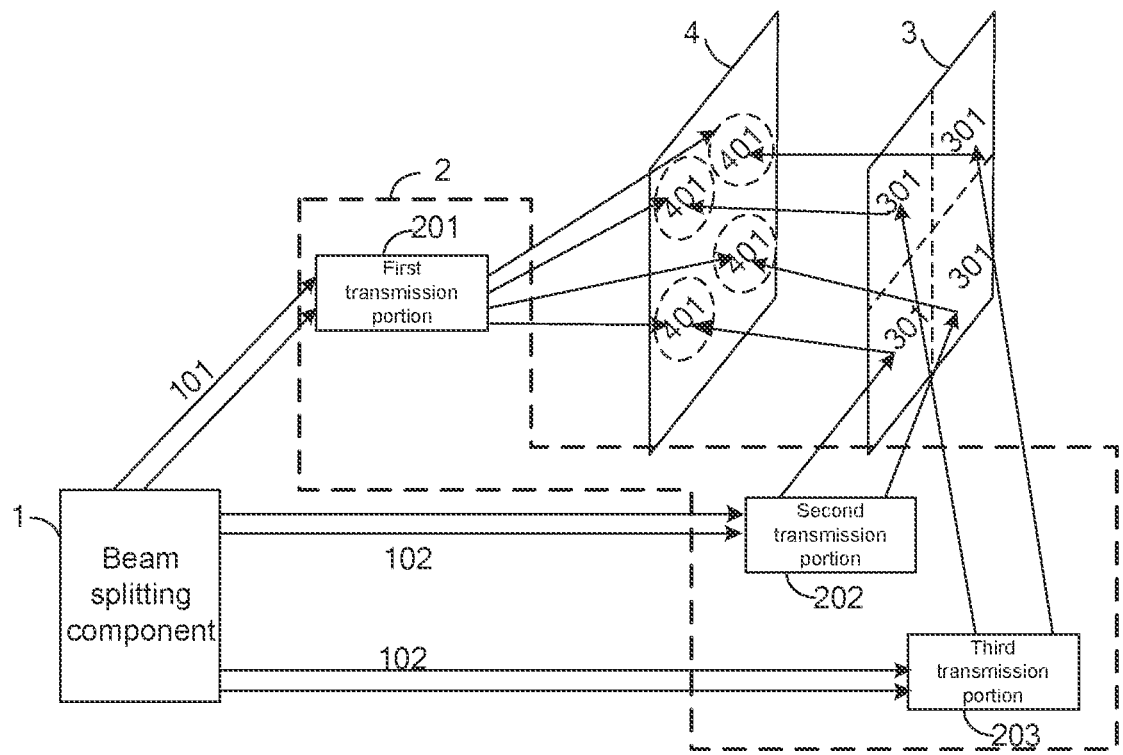
FIG. 4 is a diagram illustrating a structure of another holographic optical apparatus, in accordance with some embodiments of the present disclosure.

Optionally, as shown in FIG. 4, the transmission assembly 2 includes a first transmission portion 201, a second transmission portion 202 and a third transmission portion 203.

The first transmission portion 201 is configured to transmit the reference light 101 to the optical element 4, For example, the first transmission portion 201 may sequentially transmit the reference light 101 to recording regions 401 in the recording medium layer 41 of the optical element 4.

The second transmission portion 202 is configured to transmit the signal light 102 to part of all the focal length modulation regions 301 of the focal length modulation component 3. For example, as shown in FIG. 4, in a case where a number of focal length modulation regions 301 in the focal length modulation component 3 is four, the second transmission portion 202 is configured to transmit the signal light 102 to two focal length modulation regions 301 of all the focal length modulation regions 301 of the focal length modulation component 3. The second transmission portion 202 may also sequentially transmit the signal light 102 to the two focal length modulation regions 301 of the focal length modulation component 3 in a time-sharing manner.

The third transmission portion 203 is configured to transmit the signal light 102 to a remaining part of all the focal length modulation regions 301 of the focal length modulation component 3. For example, as shown in FIG. 4, in the case where the number of the focal length modulation regions 301 in the focal length modulation component 3 is four, the third transmission portion 203 is configured to transmit the signal light 102 to the other two focal length modulation regions 301 of all the focal length modulation regions 301 of the focal length modulation component 3, The third transmission portion 203 may also sequentially transmit the signal light 102 to the two focal length modulation regions 301 of the focal length modulation component 3 in a time-sharing manner.

In the present embodiment, compared with a projection device using digital light processing in the related art, using the second transmission portion 202 and the third transmission portion 203 to separately transmit the signal light 102 to the plurality of focal length modulation regions of the focal length modulation component 3 has lower requirements on accuracy, a simpler structure and lower costs.

Based on the above, optionally, a number of the focal length modulation regions 301 is at least three.

In this case, for example, the second transmission portion 202 is configured to transmit the signal light 102 to one focal length modulation region 301 of all the focal length modulation regions 301 of the focal length modulation component 3, and the third transmission portion 203 is configured to transmit the signal light 102 to two focal length modulation regions 301 of all the focal length modulation regions 301 of the focal length modulation component 3.

Figure 5A:
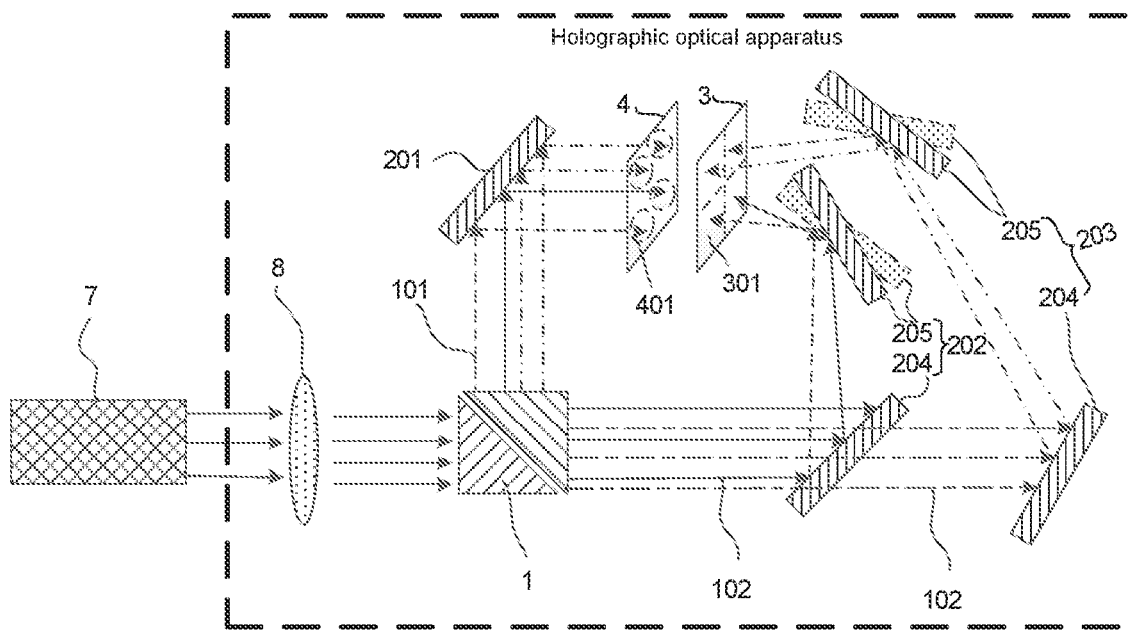
FIG. 5A is a diagram illustrating a structure of yet another holographic optical apparatus, in accordance with some embodiments of the present disclosure.

Optionally, as shown in FIG. 5A, at least one of the second transmission portion 202 and the third transmission portion 203 includes a first reflecting component 204 and a second reflecting component 205.

The first reflecting component 204 is configured to receive the signal light 102 from the beam splitting component 1 and transmit the signal light 102 to the second reflecting component 205.

The second reflecting component 205 is a rotatable reflecting component, and the second reflecting component 205 is configured to transmit the received signal light 102 to different focal length modulation regions 301 at different rotation angles.

For example, the number of the focal length modulation regions is four. In this case, as shown in FIG. 5A, after receiving the signal light 102 from the beam splitting component 1, a first reflecting component 204 of the second transmission portion 202 reflects the signal light 102 to a second reflecting component 205 of the second transmission portion 202, and the second reflecting component 205 of the second transmission portion 202 transmits the signal light 102 to a focal length modulation region 301. After that, the second reflecting component 205 of the second transmission portion 202 may be rotated to change an angle of the second reflecting component 205 of the second transmission portion 202 (e.g., the second reflecting component 205 of the second transmission portion 202 shown by the dashed lines in FIG. 5A), and the signal light 102 is transmitted to another focal length modulation region 301 by using the second reflecting component 205 of the second transmission portion 202. Then, the first reflecting component 204 of the second transmission portion 202 is removed, and the third transmission portion 203 is used to transmit the signal light 102. Similarly, after receiving the signal light, a first reflecting component 204 of the third transmission portion 203 transmits the signal light 102 to a second reflecting component 205 of the third transmission portion 203, and then the second reflecting component 205 of the third transmission portion 203 transmits the signal light 102 to yet another focal length modulation region 301. Then, the second reflecting component 205 of the third transmission portion 203 is rotated to change its angle (e.g., the second reflecting component 205 of the third transmission portion 203 shown by the dashed lines in FIG. 5A), so as to transmit the signal light 102 to a remaining focal length modulation region 301.

Based on this, when the signal light 102 is transmitted to each focal length modulation region 301 and travels to a corresponding recording region 401, the reference light 101 is synchronously transmitted to the recording region 401 of the optical element 4 corresponding to the focal length modulation region 301.

In a case where the second transmission portion 202 and the third transmission portion 203 each include the first reflecting component 204 and the second reflecting component 205, the second transmission portion 202 and the third transmission portion 203 may transmit the signal light 102 relatively separately, and the signal light 102 may be transmitted to different focal length modulation regions 301 only by rotating the second reflecting component 205 in the second transmission portion 202 and the second reflecting component 205 in the third transmission portion 203, which is convenient and fast.

Figure 5B:
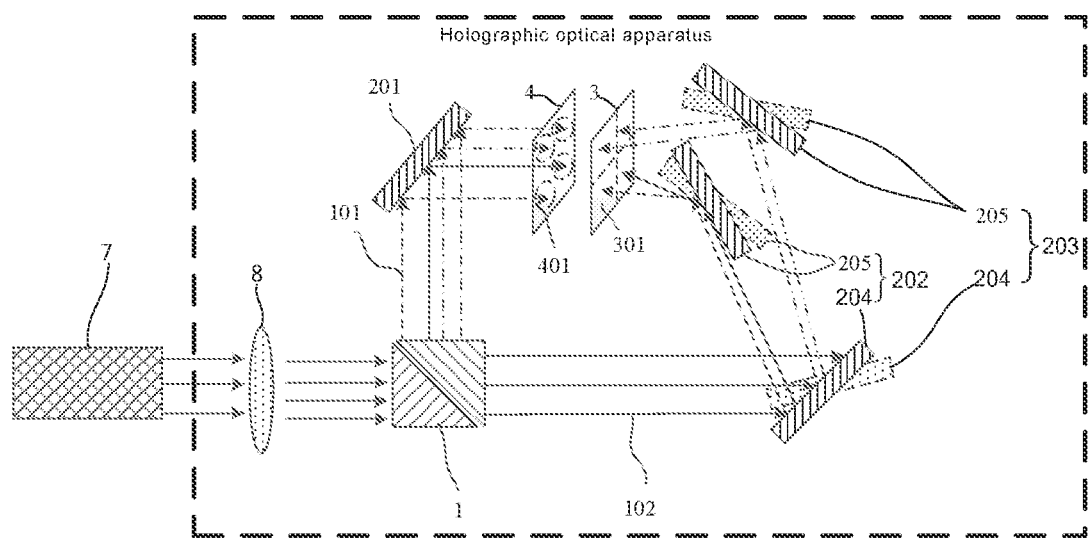
FIG. 5B is a diagram illustrating a structure of yet another holographic optical apparatus, in accordance with some embodiments of the present disclosure.

Based on this, optionally, as shown in FIG. 5B, the first reflecting component 204 in the second transmission portion 202 and the first reflecting component 204 in the third transmission portion 203 are a same reflecting component. In this case, the first reflecting component 204 is a rotatable reflecting component, that is, the first reflecting component 204 may be used in both the second transmission portion 202 and the third transmission portion 203.

In this case, that the first reflecting component 204 is configured to receive the signal light 102 exiting from the beam splitting component 1, and transmit the signal light 102 to the second reflecting component 205 includes: transmitting, by the first reflecting component 204, the signal light 102 to the second reflecting component 205 of the second transmission portion 202 at a first rotation angle, and transmitting, by the first reflecting component 204, the signal light 102 to the second reflecting component 205 of the third transmission portion 203 at a second rotation angle.

When the first reflecting component 204 is at the first rotation angle (e.g., shown by the solid line in FIG. 5B) and at the second rotation angle (e.g., shown by the dashed line in FIG. 5B) respectively, the first reflecting component 204 may separately transmits the signal light 102 from the beam splitting component 1 to the second reflecting component 205 of the second transmission portion 202 and the second reflecting component 205 of the third transmission portion 203.

By setting the first reflecting component 204 as a rotatable reflecting component, the first reflecting component 204 in the second transmission portion 202 may be further used as the first reflecting component 204 in the third transmission portion 203, so that an entire structure of the holographic optical apparatus may be simple and easy to construct.

Based on this, optionally, as shown in FIGS. 5A and 5B, a number of the focal length modulation regions 301 is four.

In this case, that the second reflecting component 205 is configured to transmit the received signal light 102 to different focal length modulation regions 301 at different rotation angles includes: transmitting, by the second reflecting component 205 of the second transmission portion 202, the received signal light 102 to a first focal length modulation region 301 at a third rotation angle; transmitting, by the second reflecting component 205 of the second transmission portion 202, the received signal light 102 to a second focal length modulation region 301 at a fourth rotation angle; transmitting, by the second reflecting component 205 of the third transmission portion 203, the received signal light 102 to a third focal length modulation region 301 at a fifth rotation angle; and transmitting, by the second reflecting component 205 of the third transmission portion 203, the received signal light 102 to a fourth focal length modulation region 301 at a sixth rotation angle.

Based on the above, when the signal light 102 is transmitted to the second reflecting component 205 of the second transmission portion 202, the second reflecting component 205 of the second transmission portion 202 transmits the signal light 102 to a focal length modulation region 301 at the third rotation angle (e.g., the second reflecting component 205 of the second transmission portion 202 shown by the solid lines in FIGS. 5A and 5B). After that, the second reflecting component 205 of the second transmission portion 202 may be rotated to change its rotation angle to the fourth rotation angle (e.g., the second reflecting component 205 of the second transmission portion 202 shown by the dashed lines in FIGS. 5A and 5B), so as to transmit the signal light 102 to another focal length modulation region 301.

When the signal light 102 is transmitted to the second reflecting component 205 of the third transmission portion 203, the second reflecting component 205 of the third transmission portion 203 transmits the signal light 102 to yet another focal length modulation region 301 at the fifth rotation angle (e.g., the second reflecting component 205 of the third transmission portion 203 shown by the solid lines in FIGS. 5A and 5B). After that, the second reflecting component 205 of the third transmission portion 203 may be rotated to change its angle to the sixth rotation angle (e.g., the second reflecting component 205 of the third transmission portion 203 shown by the dashed lines in FIGS. 5A and 5B), so as to transmit the signal light 102 to the remaining focal length modulation region 301.

In the case where there are four focal length modulation regions 301, the second transmission portion 202 may transmit the signal light 102 to two focal length modulation regions 301. Similarly, the third transmission portion 203 may also transmit the signal light 102 to remaining two focal length modulation regions 301. The second transmission portion 202 and the third transmission portion 203 may be fully utilized.

Optionally, the first reflecting component 204 and the second reflecting component 205 are both micro electro-mechanical system (MEMS) micro-mirrors.

A MEMS micro-mirror is manufactured by using optical MEMS technology, and a low-light-level mirror and a MEMS driver are integrated to form the MEMS micro-mirror.

The MEMS driver is electromagnetically driven, and has advantages of low driving voltage, no need for a booster chip, and high driving frequency, so that the MEMS driver may drive the low-light-level mirror to twist a certain angle.

Figure 6:
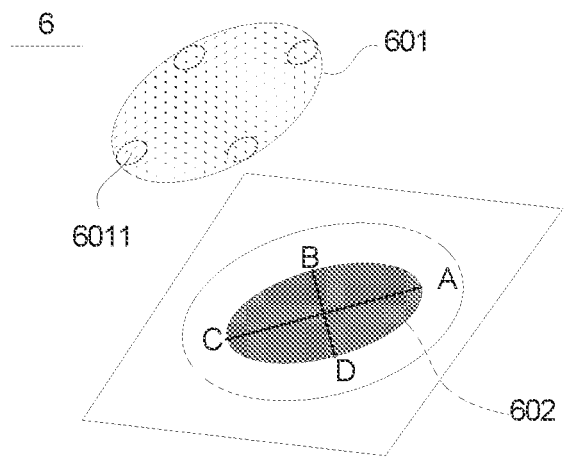
FIG. 6 is a diagram illustrating a structure of a micro electro-mechanical system (MEMS) micro-mirror, in accordance with some embodiments of the present disclosure.

As shown in FIG. 6, a principle of rotation of the MEMS micro-mirror 6 is that, a back face (i.e., a non-reflective surface) of the low-light-level mirror 601 is provided with, for example, four coils 6011 thereon, the MEMS driver is provided with an annular magnet 602 therein, and the four coils 6011 are in one-to-one correspondence with four positions on the annular magnet, i.e., the four positions A, B, C and D shown in FIG. 6. When currents are applied to coils 6011 corresponding to the positions A and C, the two coils 6011 may generate alternating current (AC) excitation signals with a phase difference of 90°, which causes the two coils 6011 to generate magnetic fields with opposite and alternating polarities. The magnetic fields generated by the two coils 6011 separately interact with the annular magnet 602 to generate torques in opposite directions, and the low-light-level mirror 601 will twist with a connecting line between the position B and the position D as an axis. Similarly, if currents are applied to the other two coils 6011 corresponding to the positions B and D, the low-light-level mirror 601 will twist with a connecting line between the position A and the position B as an axis, and an exit direction of the signal light 102 incident on the low-light-level mirror 601 may be changed after the low-light-level mirror 601 is twisted.

Using the MEMS micro-mirror 6 to change the direction of the signal light 102 may have a high control accuracy and be easy to operate.

Based on the above, optionally, the first transmission portion 201 is a MEMS micro-mirror 6.

In a case where the first transmission portion 201 separately transmits the reference light 101 exiting from the beam spotting component 1 to recording regions 401 in the recording medium layer 41 of the optical element 4, using the MEMS micro-mirror 6 as the first transmission portion 201 may facilitate to adjust a transmission direction of the reference light 101, so that the reference light 101 transmitted by the beam splitting component 1 may be separately transmitted to recording regions 401 of the optical element 4.

Using the MEMS micro-mirror 6 to change the transmission direction of the reference light 101 may have a high control accuracy. In addition, in a case where the first reflecting component 204, the second reflecting component 205 and the first transmission portion are all MEMS micro-mirrors 6, it may facilitate to manufacture the transmission assembly.

Figure 7A:
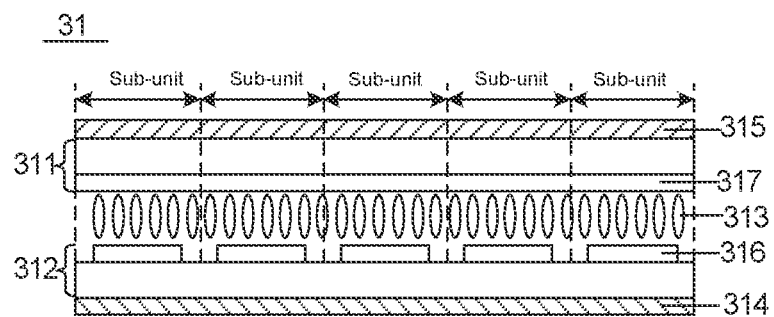
FIG. 7A is a diagram illustrating a structure of a spatial light modulator, in accordance with some embodiments of the present disclosure.

Optionally, the focal length modulation component 3 is a spatial light modulator 31. As shown in FIG. 7A, the spatial light modulator 31 includes an upper substrate 311, a lower substrate 312, a liquid crystal layer 313 located between the upper substrate 311 and the lower substrate 312, a lower polarizer 314 located on a side of the lower substrate 312 away from the upper substrate 311, and an upper polarizer 315 located on a side of the upper substrate 311 away from the lower substrate 312. The spatial light modulator 31 has a plurality of sub-units, and each sub-unit is provided with a first electrode 316 and a second electrode 317 therein. The first electrode 316 is disposed in the lower substrate 312, and the second electrode 317 is disposed in the lower substrate 312 or the upper substrate 311.

It will be understood that, the first electrode 316 and the second electrode 317 are insulated from each other.

Optionally, as shown in FIG. 7A, the first electrode 316 is disposed in the lower substrate 312, and the second electrode 317 is disposed in the upper substrate 311. First electrodes 316 in different sub-units are insulated from each other, and second electrodes 317 in all the sub-units are electrically connected and integrated as a whole.

Optionally, the first electrode 316 and the second electrode 317 are both disposed in the lower substrate 312, and they are disposed in different layers. First electrodes 316 in different sub-units are insulated from each other, and the second electrodes 317 in all the sub-units are electrically connected and integrated as a whole. The first electrode 316 is disposed at a side of the second electrode 317 proximate to the upper substrate 311.

Optionally, the first electrode 316 and the second electrode 317 are both disposed in the lower substrate 312, and they are disposed in a same layer. First electrodes 316 in different sub-units are insulated from each other, second electrodes 317 in different sub-units are insulated from each other, and the first electrode 316 and the second electrode 317 each have a comb-tooth structure including a plurality of strip-shaped sub-electrodes.

Figure 7B:
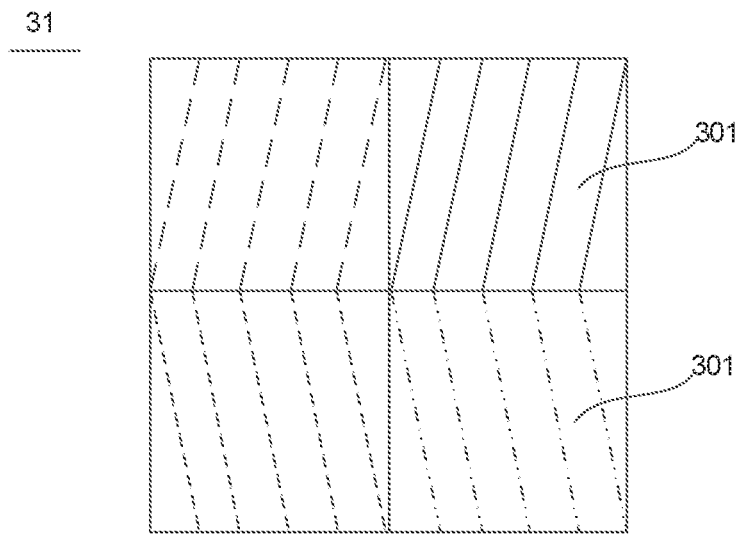
FIG. 7B is a diagram illustrating a distribution of focal length modulation regions of a spatial light modulator, in accordance with some embodiments of the present disclosure.

The spatial light modulator 31 is a device that modulates a spatial distribution of light waves. The sub-units in the spatial light modulator 31 may be referred as pixels of the spatial light modulator 31. By writing information including information for controlling the pixels to the spatial light modulator 31, and transferring the written information to positions of corresponding pixels through addressing, some parameters, such as phases, of the light waves may be modulated under control of the written information. Based on this, the pixels may be grouped, and each group is used as a focal length modulation region 301. For example, as shown in FIG. 7B, the pixels may be divided into four groups, each group is used as a focal length modulation region, and pixels in each group are separately controlled, so that a focal length of a region where each group is located may be separately controlled.

In the embodiments of the present disclosure, since the phases of the signal light 102 correspond to the image distances of the images formed after the signal light 102 passes through the focal length modulation regions 301, by using the spatial light modulator 31 to modulate the phases of the signal light 102, the image distances of the images formed after the signal light 102 passes through the focal length modulation regions 301 may be modulated. Using the spatial light modulator 31 to modulate the image distance of the image formed after the signal light 102 passes through the focal length modulation region 301 may have advantages of fast response speed and high efficiency.

Figure 7C:
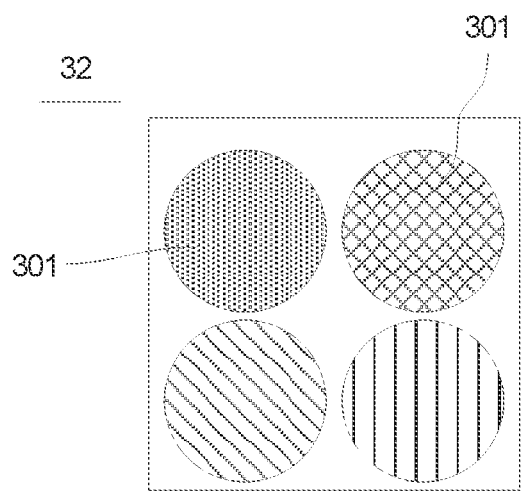
FIG. 7C is a diagram illustrating a structure of a lens group, in accordance with some embodiments of the present disclosure.

Optionally, as shown in FIG. 7C, the focal length modulation component 3 is a lens group 32, the lens group 32 includes a plurality of lenses with different focal lengths, and a region where each lens is located is a focal length modulation region 301.

As shown in FIG. 7C, taking the lens group including four lenses with different focal lengths as an example, an image distance of an image formed by signal light 102 exiting from each lens may be equal to a focal length of the lens. Using the lens to directly modulate the signal light 102 may have advantages of simplicity and convenience. The focal length modulation component 3 composed of the lens may have a simple structure and be easy to manufacture.

Figure 8:
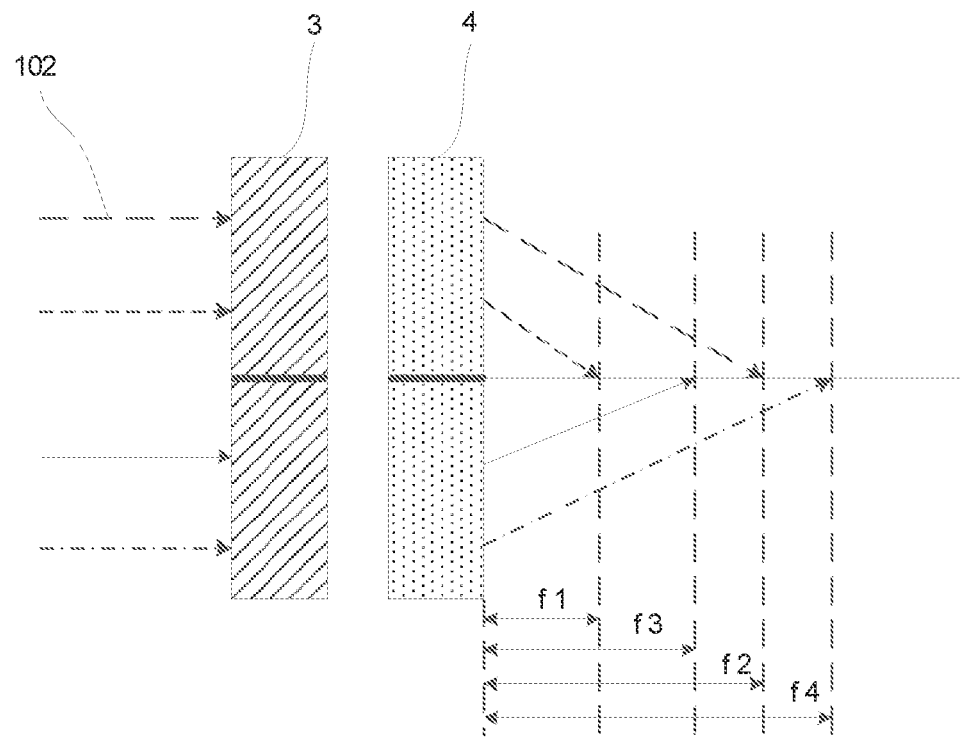
FIG. 8 is a schematic diagram illustrating different image distances after signal light is modulated, in accordance with some embodiments of the present disclosure.

As shown in FIG. 8, the signal light 102 has different image distances after being modulated by the focal length modulation component 3, and the interference fringes generated with the reference light 101 in the optical element 4 also include image distance information of the signal light 102. The restored images restored by using the interference fringes may include the image distance information, such as the image distances f1, f2, f3 and f4 shown in FIG. 8. The restored images with different image distances have different depths of field, and thus the optical element 4 has a plurality of depths of field.

Optionally, as shown in FIGS. 5A and 5B, the holographic optical apparatus further includes a collimating beam expander 8. The collimating beam expander 8 is disposed at a light incident side of the beam splitting component 1; and the collimating beam expander 8 is used to collimate and expand the light emitted by the light source 7. Light after collimation and expansion may be easily split into the reference light 101 and the signal light 102.

Based on the above description, optionally, the recording medium layer 41 is a photosensitive polymer layer, and the photosensitive polymer layer is disposed on the glass substrate of the optical element 4.

Figure 9:
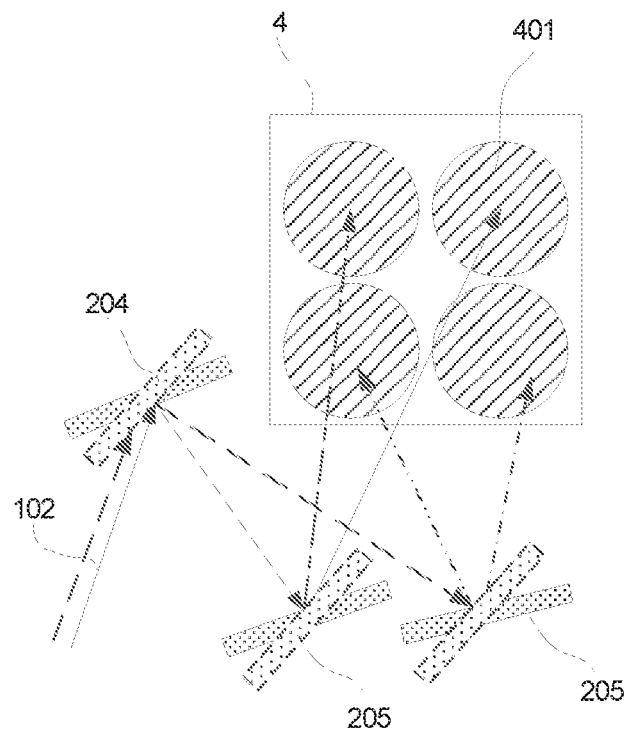
FIG. 9 is a diagram illustrating a principle of recording interference fringes in different recording regions, in accordance with some embodiments of the present disclosure.

The photosensitive polymer is highly sensitive to light, and its structure or properties will change significantly under action of the light, so it can be used to record the interference fringes. As shown in FIG. 9, with the photosensitive polymer layer of the optical element 4 including four recording regions 401 as an example, each recording region 401 is used to record interference fringes formed by signal light 102 with a certain focal length and reference light 101 with a certain focal length. The plurality of recording regions 401 in the photosensitive polymer layer are discretely distributed, and at most only one glass substrate is required to support the photosensitive polymer layer. Therefore, a thickness of an entire optical element 4 is small, and using the optical element in the embodiments of the present disclosure to restore images may have an advantage of high display brightness.

As shown in FIGS. 1, 5A and 53, some embodiments of the present disclosure further provide a holographic optical system, and the holographic optical system includes the light source 7 and the above holographic optical apparatus.

The holographic optical system provided by the present embodiments has same beneficial effects as the above holographic optical apparatus, and thus details will not be repeated herein.

Based on this, optionally, the light source 7 is a display device or a projection device. The display device or the projection device is used to output images, and each image is sequentially and separately output. All light included in each image is split into reference light 101 and signal light 102 after passing through the beam splitting component 1, The reference light 101 and the signal light 102 will interfere with each other and form interference fringes in each recording region 401 of the optical element 4. Using the display device or the projection device to output the images may have advantages of large storage capacity and being easy to control the output of the images.

As shown in FIG. 3, some embodiments of the present disclosure further provide a holographic display system, and the holographic display system includes the light source 7, the beam splitting component 1, the first transmission portion 201 and the optical element 4.

The beam splitting component 1 is configured to receive the light emitted by the light source 7 and output the reference light 101.

The first transmission portion 201 is disposed in the light-exit path of the beam splitting component 1. For example, the first transmission portion 201 may be disposed on the light-exit side of the beam splitting component 1. The first transmission portion 201 is configured to transmit the reference light 101 to the optical element 4. The optical element 4 may be disposed on a light-exit side of the first transmission portion 201, and the optical element 4 includes the recording medium layer 41. The recording medium layer 41 includes the plurality of recording regions 401, and interference fringes are recorded in each recording region 401. The interference fringes are formed by the above holographic optical apparatus.

The holographic display system provided by the present embodiments may achieve the "diffraction reproduction". The beam splitting component 1, the first transmission portion 201 and the optical element 4 may be the same as the beam splitting component 1, the first transmission portion 201 and the optical element 4 in the above holographic optical apparatus, and details will not be repeated herein.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A holographic optical apparatus, comprising:
   a beam splitting component configured to split received light into reference light and signal light, and output the reference light and the signal light, the reference light and the signal light being coherent light;
   a focal length modulation component including a plurality of focal length modulation regions, focal lengths of the plurality of focal length modulation regions being different from each other;
   an optical element including a recording medium layer, the recording medium layer including a plurality of recording regions, and each recording region being located in a light-exit path of a focal length modulation region; and
   a transmission assembly disposed in a light-exit path of the beam splitting component, the transmission assembly being configured to transmit the reference light to the plurality of recording regions, and transmit the signal light to the plurality of focal length modulation regions,
   wherein the recording medium layer is configured to receive the signal light after being modulated by the focal length modulation region, and record interference fringes generated by interference between the signal light and the reference light in the recording region
   wherein the transmission assembly includes:
      a first transmission portion configured to transmit the reference light to the plurality of recording regions;
      a second transmission portion configured to transmit the signal light to part of the plurality of focal length modulation regions; and
      a third transmission portion configured to transmit the signal light to a remaining part of the plurality of focal length modulation regions.

2. The holographic optical apparatus according to claim 1, wherein at least one of the second transmission portion and the third transmission portion includes a first reflecting component and a second reflecting component;
   the first reflecting component is configured to receive the signal light exiting from the beam splitting component, and transmit the signal light to the second reflecting component; and
   the second reflecting component is a rotatable reflecting component, and the second reflecting component is configured to transmit the received signal light to different focal length modulation regions at different rotation angles.

3. The holographic optical apparatus according to claim 2, wherein at least one of the first reflecting component and the second reflecting component is a micro electro-mechanical system micro-mirror.

4. The holographic optical apparatus according to claim 2, wherein a number of the focal length modulation regions is four;
   the second transmission portion and the third transmission portion each include the first reflecting component and the second reflecting component;
   the second reflecting component in the second transmission portion is configured to transmit the received signal light to a first focal length modulation region at a third rotation angle, and transmit the received signal light to a second focal length modulation region at a fourth rotation angle; and
   the second reflecting component in the third transmission portion is configured to transmit the received signal light to a third focal length modulation region at a fifth rotation angle, and transmit the received signal light to a fourth focal length modulation region at a sixth rotation angle.

5. The holographic optical apparatus according to claim 1, wherein the second transmission portion and the third transmission portion include a same first reflecting component, and the first reflecting component is a rotatable reflecting component;
   the second transmission portion and the third transmission portion each include a second reflecting component; and
   the first reflecting component is configured to receive the signal light exiting from the beam splitting component, transmit the signal light to a second reflecting component in the second transmission portion at a first rotation angle, and transmit the signal light to a second reflecting component in the third transmission portion at a second rotation angle.

6. The holographic optical apparatus according to claim 5, wherein a number of the focal length modulation regions is four;
   the second reflecting component in the second transmission portion is configured to transmit the received signal light to a first focal length modulation region at a third rotation angle, and transmit the received signal light to a second focal length modulation region at a fourth rotation angle; and
   the second reflecting component in the third transmission portion is configured to transmit the received signal light to a third focal length modulation region at a fifth rotation angle, and transmit the received signal light to a fourth focal length modulation region at a sixth rotation angle.

7. The holographic optical apparatus according to claim 1, wherein the first transmission portion is a micro electro-mechanical system micro-mirror.

8. The holographic optical apparatus according to claim 1, wherein the focal length modulation component includes a spatial light modulator;
   the spatial light modulator includes an upper substrate, a lower substrate, a liquid crystal layer located between the upper substrate and the lower substrate, a lower polarizer located on a side of the lower substrate away from the upper substrate, and an upper polarizer located on a side of the upper substrate away from the lower substrate; and the spatial light modulator has a plurality of sub-units, each sub-unit is provided with a first electrode and a second electrode therein, the first electrode is disposed on the lower substrate, and the second electrode is disposed on the lower substrate or the upper substrate.

9. The holographic optical apparatus according to claim 1, wherein the focal length modulation component includes a lens group; and the lens group includes a plurality of lenses with different focal lengths, and a region where each lens is located is a focal length modulation region.

10. The holographic optical apparatus according to claim 1, further comprising:

a collimating beam expander disposed at a light incident side of the beam splitting component; and the collimating beam expander being configured to collimate and expand light directed to the beam splitting component.

11. The holographic optical apparatus according to claim 1, wherein the recording medium layer is a photosensitive polymer layer.

12. A holographic optical system, comprising:

a light source; and the holographic optical apparatus according to claim 1.

13. The holographic optical system according to claim 12, wherein the light source is a display device or a projection device.

14. A holographic display system, comprising a light source, a beam splitting component, a first transmission portion, and an optical element, wherein the beam splitting component is configured to receive light emitted by the light source and output reference light;

the first transmission portion is disposed in a light-exit path of the beam splitting component; and the first transmission portion is configured to transmit the reference light to the optical element; and the optical element includes a recording medium layer; the recording medium layer includes a plurality of recording regions, and the recording medium layer is configured to record interference fringes in recording regions, wherein the interference fringes are formed by the holographic optical apparatus according to claim 1.

* * * * *